(12) United States Patent
Takeyama et al.

(10) Patent No.: US 11,816,704 B2
(45) Date of Patent: Nov. 14, 2023

(54) CONTROL APPARATUS, COMMUNICATION SYSTEM, NON-TRANSITORY COMPUTER READABLE MEDIUM, AND ADVERTISEMENT SALES METHOD

(71) Applicant: Toyota Jidosha Kabushiki Kaisha, Toyota (JP)

(72) Inventors: Hiroaki Takeyama, Nagoya (JP); Kenichi Yamada, Nisshin (JP); Hideo Hasegawa, Nagoya (JP); Bryce H. Morisako, Frisco, TX (US)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 56 days.

(21) Appl. No.: 17/408,902

(22) Filed: Aug. 23, 2021

(65) Prior Publication Data
US 2022/0067790 A1 Mar. 3, 2022

(30) Foreign Application Priority Data
Aug. 25, 2020 (JP) ................................. 2020-142098

(51) Int. Cl.
*G06Q 30/00* (2023.01)
*G06Q 30/0273* (2023.01)
(Continued)

(52) U.S. Cl.
CPC ..... *G06Q 30/0275* (2013.01); *G06Q 30/0264* (2013.01); *G06Q 30/0266* (2013.01); *G06Q 30/0267* (2013.01)

(58) Field of Classification Search
CPC .......... G06Q 30/0275; G06Q 30/0264; G06Q 30/0266; G06Q 30/0267
See application file for complete search history.

(56) References Cited

U.S. PATENT DOCUMENTS

| 6,850,209 B2 * | 2/2005 | Mankins ................. G09F 21/04 |
| | | 345/1.3 |
| 2007/0050248 A1 * | 3/2007 | Huang .................. H04W 4/024 |
| | | 705/14.62 |

(Continued)

FOREIGN PATENT DOCUMENTS

| JP | 2003-241698 A | 8/2003 |
| JP | 2009-169500 A | 7/2009 |

(Continued)

OTHER PUBLICATIONS

Advertisement Delivery and Display in Vehicular Networks: Using V2V Communications for Targeted Ads. IEEE. 2017 (Year: 2017).*

(Continued)

*Primary Examiner* — Maria V Vanderhorst
(74) *Attorney, Agent, or Firm* — Dinsmore & Shohl LLP (57) ABSTRACT

A control apparatus includes a communication interface configured to transmit, to at least one bidding apparatus, range data indicating a geographical range through which at least one vehicle travels, and receive, from the at least one bidding apparatus, bidding data for bidding on an advertising slot associated with the geographical range indicated by the range data, and a controller configured to determine a bidder to whom the advertising slot is to be sold based on the bidding data received by the communication interface.

12 Claims, 9 Drawing Sheets

(51) Int. Cl.
*G06Q 30/0251* (2023.01)
*G05B 19/418* (2006.01)

(56) References Cited

U.S. PATENT DOCUMENTS

| | | | |
|---|---|---|---|
| 2014/0222582 A1* | 8/2014 | Papalia | G06Q 30/0275 |
| | | | 705/14.66 |
| 2018/0150711 A1* | 5/2018 | Wilbert | G06V 20/63 |
| 2020/0065041 A1 | 2/2020 | Ichikawa et al. | |

FOREIGN PATENT DOCUMENTS

| | | |
|---|---|---|
| JP | 2012-519331 A | 8/2012 |
| JP | 2020-030361 A | 2/2020 |
| WO | 2010099427 A2 | 9/2010 |

OTHER PUBLICATIONS

"Dynamic Advertising in VANETs Using Repeated Auctions". IEEE. 2017 (Year: 2017).*
"Towards an Integrated LBS-Enabled, Mobile Auctions Marketplace for Logistics Services". IEEE. 2007. This publication discloses (Year: 2007).*

* cited by examiner

CONTROL APPARATUS, COMMUNICATION SYSTEM, NON-TRANSITORY COMPUTER READABLE MEDIUM, AND ADVERTISEMENT SALES METHOD

CROSS-REFERENCE TO RELATED APPLICATION

This application claims priority to Japanese Patent Application No. 2020-142098, filed on Aug. 25, 2020 the entire contents of which are incorporated herein by reference.

TECHNICAL FIELD

The present disclosure relates to a control apparatus, a communication system, a program, and an advertisement sales method.

BACKGROUND

Patent Literature (PTL) 1 discloses technology relating to advertisement auctioning.

CITATION LIST

Patent Literature

PTL 1: JP 2012-519331 A

SUMMARY

With respect to vehicles traveling through a specific geographical range, advertising slots for advertisements inside or outside the vehicles may be sold. Alternatively, with respect to advertising signs installed at outdoor locations visible from a specific geographical range, advertising slots for outdoor advertisements may be sold. However, in conventional technology, advertising slots cannot be sold in association with a specific geographical range.

It would be helpful to sell advertising slots in association with a specific geographical range.

A control apparatus according to the present disclosure includes:

a communication interface configured to transmit, to at least one bidding apparatus, range data indicating a geographical range through which at least one vehicle travels, and receive, from the at least one bidding apparatus, bidding data for bidding on an advertising slot associated with the geographical range indicated by the range data; and a controller configured to determine a bidder to whom the advertising slot is to be sold based on the bidding data received by the communication interface.

A program according to the present disclosure is configured to cause a computer to execute operations, the operations including:

receiving, from a control apparatus, range data indicating a geographical range through which at least one vehicle travels;

performing control to output the received range data;

generating, in response to a user operation, bidding data for bidding on an advertising slot associated with the geographical range indicated by the range data; and transmitting the generated bidding data to the control apparatus.

An advertisement sales method according to the present disclosure includes:

transmitting, by a control apparatus to at least one bidding apparatus, range data indicating a geographical range through which at least one vehicle travels;

receiving, by the control apparatus from the at least one bidding apparatus, bidding data for bidding on an advertising slot associated with the geographical range indicated by the range data; and determining, by the control apparatus, a bidder to whom the advertising slot is to be sold based on the bidding data.

According to the present disclosure, advertising slots can be sold in association with a specific geographical range.

DETAILED DESCRIPTION

Hereinafter, some embodiments of the present disclosure will be described with reference to the drawings.

In the drawings, the same or corresponding portions are denoted by the same reference numerals. In the descriptions of the embodiments, detailed descriptions of the same or corresponding portions are omitted or simplified, as appropriate.

A first embodiment, an embodiment of the present disclosure, will be described.

Figure 1:
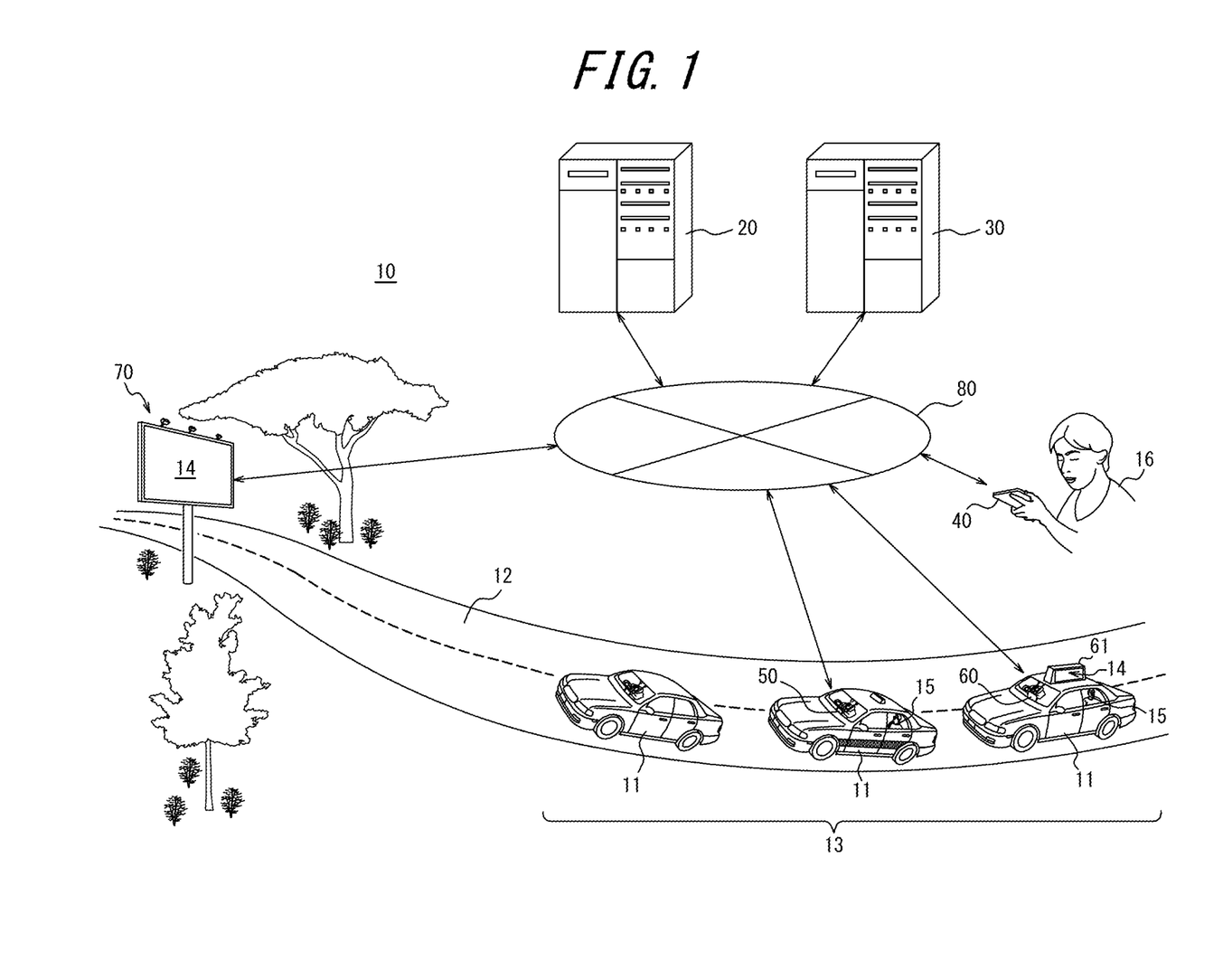
FIG. 1 is a diagram illustrating a configuration of a communication system according to a first embodiment of the present disclosure.

An outline of the present embodiment will be described with reference to FIG. 1.

In the present embodiment, range data D1 indicating a geographical range through which at least one vehicle 11 travels is transmitted by a control apparatus 20 to at least one bidding apparatus 40. Bidding data D2 for bidding on an advertising slot associated with the geographical range indicated by the range data D1 is received by the control apparatus 20 from the at least one bidding apparatus 40. A bidder to whom the advertising slot is to be sold is determined by the control apparatus 20 based on the bidding data D2.

According to the present embodiment, advertising slots can be sold in association with a specific geographical range. For example, with respect to vehicles 11 traveling through a section 13 of a road 12, advertising slots for advertisements inside or outside the vehicles 11 can be sold. Alternatively, with respect to an advertising sign 70 installed at an outdoor location visible from the section 13 of the road 12, advertising slots for outdoor advertisements can be sold. That is, advertising slots can be sold in association with the section 13 of the road 12.

Bidders can present, in purchased advertising slots, advertisements 14 related to the associated geographical range. For example, it is possible to present, to persons 15 who are on board vehicles 11 traveling through the section 13 of the road 12, advertisements inside the vehicles 11 regarding a POI such as a restaurant, a hotel, a sightseeing spot, a park, an amusement park, a movie theater, a convenience store, a supermarket, a shopping mall, a department store, a pharmacy, a station, an airport, a parking lot, a hospital, a post office, or a bank ahead of or in the vicinity of the section 13. The term "POI" is an abbreviation of point of interest. Alternatively, it is possible to present, using a display 61 attached to a vehicle 11 traveling through the section 13 of the road 12, an advertisement outside the vehicle 11 regarding the POI ahead of or in the vicinity of the section 13. Alternatively, it is possible to present, using the advertising sign 70 installed at the outdoor location visible from the section 13 of the road 12, an outdoor advertisement regarding the POI ahead of or in the vicinity of the section 13. That is, bidders can present, in purchased advertising slots, advertisements 14 related to the section 13 of the road 12. As a result, it is expected that the effectiveness in promotion may be improved. It is also expected that costs for promotion may be reduced.

The geographical range with which the advertising slot is associated is the section 13 of the road 12 in the present embodiment, but may be a district such as a municipality, or another type of geographical range.

A configuration of a communication system 10 according to the present embodiment will be described with reference to FIG. 1.

The communication system 10 includes at least one control apparatus 20, at least one server apparatus 30, at least one bidding apparatus 40, at least one first terminal apparatus 50, at least one second terminal apparatus 60, and at least one advertising sign 70.

The control apparatus 20 and the server apparatus 30 are each installed in a facility such as a data center. The control apparatus 20 and the server apparatus 30 are each a computer such as a server that belongs to a cloud computing system or another type of computing system.

The bidding apparatus 40 is used by a user 16. The bidding apparatus 40 is, for example, a mobile device such as a mobile phone, a smartphone, or a tablet, or a PC. The term "PC" is an abbreviation of personal computer.

The first terminal apparatus 50 and the second terminal apparatus 60 are each mounted or installed in a corresponding vehicle 11. The first terminal apparatus 50 and the second terminal apparatus 60 are each used by a person 15 who is on board the corresponding vehicle 11. Each person 15 who is on board the corresponding vehicle 11 is specifically a driver, a passenger, or another type of occupant. The first terminal apparatus 50 and the second terminal apparatus 60 are each, for example, an in-vehicle device such as a car navigation device, a mobile device such as a mobile phone, a smartphone, or a tablet, or a PC.

Each vehicle 11 is, for example, any type of automobile such as a gasoline vehicle, a diesel vehicle, an HEV, a PHEV, a BEV, or an FCEV. The term "HEV" is an abbreviation of hybrid electric vehicle. The term "PHEV" is an abbreviation of plug-in hybrid electric vehicle. The term "BEV" is an abbreviation of battery electric vehicle. The term "FCEV" is an abbreviation of fuel cell electric vehicle. Each vehicle 11 is driven by a driver in the present embodiment, but the driving may be automated at any level. The automation level is, for example, any one of Level 1 to Level 5 according to the level classification defined by SAE. The name "SAE" is an abbreviation of Society of Automotive Engineers. Each vehicle 11 may be a MaaS-dedicated vehicle. The term "MaaS" is an abbreviation of Mobility as a Service.

The second terminal apparatus 60 is connected with a display 61 attached to the corresponding vehicle 11. As the connection method, any technology such as USB, HDMI® (HDMI is a registered trademark in Japan, other countries, or both), or Bluetooth® (Bluetooth is a registered trademark in Japan, other countries, or both) can be used. The term "USB" is an abbreviation of Universal Serial Bus. The term "HDMI®" is an abbreviation of High-Definition Multimedia Interface. The display 61 is attached to the top surface of the vehicle 11 in the present embodiment, but may be attached to any exposed surface such as a side surface of the vehicle 11.

The advertising sign 70 is installed outdoors. The advertising sign 70 is installed along a road 12 in the present embodiment, but may be installed as an overhead type, across the road 12, or may be installed at any other location such that an advertisement 14 is visible from the road 12. The advertising sign 70 is, for example, digital signage.

The control apparatus 20 can communicate with the server apparatus 30 and the bidding apparatus 40 via a network 80. The control apparatus 20 may be able to communicate with the first terminal apparatus 50, the second terminal apparatus 60, and the advertising sign 70 via the network 80. The server apparatus 30 can communicate with the bidding apparatus 40, the first terminal apparatus 50, the second terminal apparatus 60, and the advertising sign 70 via the network 80. The bidding apparatus 40, the first terminal apparatus 50, the second terminal apparatus 60, and the advertising sign 70 may be able to communicate with each other via the network 80.

The network 80 includes the Internet, at least one WAN, at least one MAN, or any combination thereof. The term "WAN" is an abbreviation of wide area network. The term "MAN" is an abbreviation of metropolitan area network. The network 80 may include at least one wireless network, at least one optical network, or any combination thereof. The wireless network is, for example, an ad hoc network, a cellular network, a wireless LAN, a satellite communication network, or a terrestrial microwave network. The term "LAN" is an abbreviation of local area network.

Figure 2:
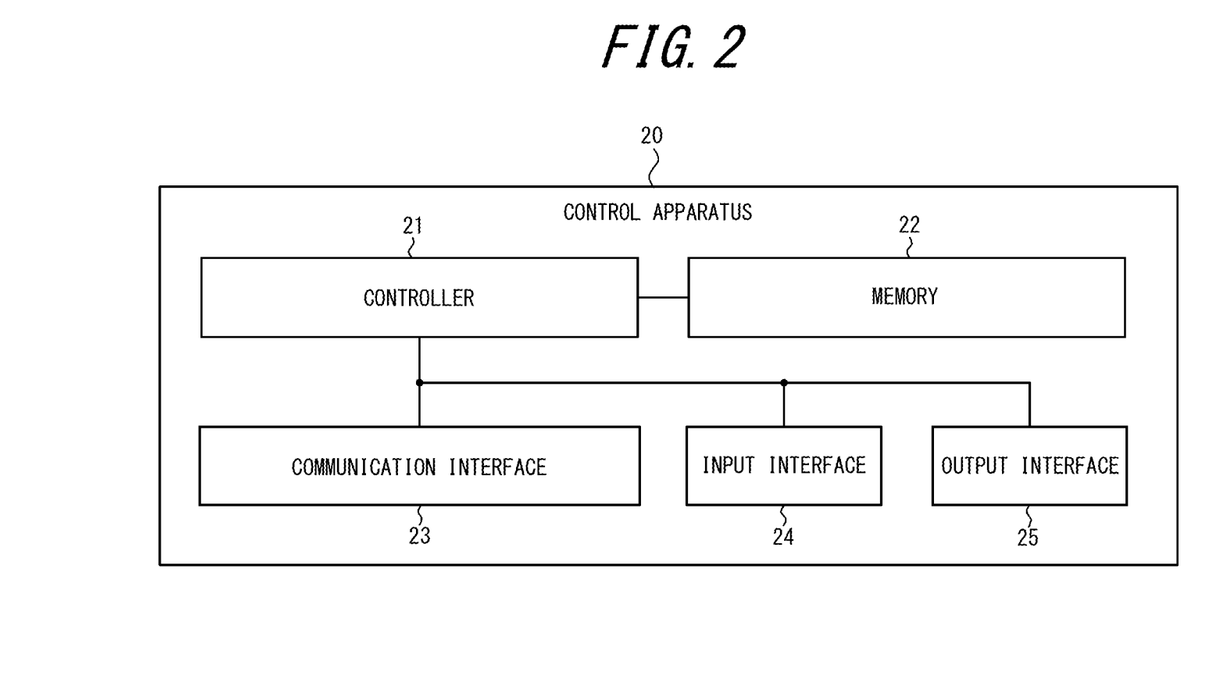
FIG. 2 is a block diagram illustrating a configuration of a control apparatus according to the first embodiment of the present disclosure.

A configuration of the control apparatus 20 according to the present embodiment will be described with reference to FIG. 2.

The control apparatus 20 includes a controller 21, a memory 22, a communication interface 23, an input interface 24, and an output interface 25.

The controller 21 includes at least one processor, at least one programmable circuit, at least one dedicated circuit, or any combination thereof. The processor is a general purpose processor such as a CPU or a GPU, or a dedicated processor that is dedicated to specific processing. The term "CPU" is an abbreviation of central processing unit. The term "GPU" is an abbreviation of graphics processing unit. The programmable circuit is, for example, an FPGA. The term "FPGA" is an abbreviation of field-programmable gate array. The dedicated circuit is, for example, an ASIC. The term "ASIC" is an abbreviation of application specific integrated circuit. The controller 21 executes processes related to operations of the control apparatus 20 while controlling components of the control apparatus 20.

The memory 22 includes at least one semiconductor memory, at least one magnetic memory, at least one optical memory, or any combination thereof. The semiconductor memory is, for example, RAM or ROM. The term "RAM" is an abbreviation of random access memory. The term "ROM" is an abbreviation of read only memory. The RAM is, for example, SRAM or DRAM. The term "SRAM" is an abbreviation of static random access memory. The term "DRAM" is an abbreviation of dynamic random access memory. The ROM is, for example, EEPROM. The term "EEPROM" is an abbreviation of electrically erasable programmable read only memory. The memory 22 functions as, for example, a main memory, an auxiliary memory, or a cache memory. The memory 22 stores data to be used for the operations of the control apparatus 20 and data obtained by the operations of the control apparatus 20.

The communication interface 23 includes at least one interface for communication. The interface for communication is, for example, a LAN interface. The communication interface 23 receives data to be used for the operations of the control apparatus 20, and transmits data obtained by the operations of the control apparatus 20.

The input interface 24 includes at least one interface for input. The interface for input is, for example, a physical key, a capacitive key, a pointing device, a touch screen integrally provided with a display, a camera, or a microphone. The input interface 24 accepts an operation for inputting data to be used for the operations of the control apparatus 20. The input interface 24, instead of being included in the control apparatus 20, may be connected to the control apparatus 20 as an external input device. As the connection method, any technology such as USB, HDMI®, or Bluetooth® can be used.

The output interface 25 includes at least one interface for output. The interface for output is, for example, a display or a speaker. The display is, for example, an LCD or an organic EL display. The term "LCD" is an abbreviation of liquid crystal display. The term "EL" is an abbreviation of electro luminescence. The output interface 25 outputs data obtained by the operations of the control apparatus 20. The output interface 25, instead of being included in the control apparatus 20, may be connected to the control apparatus 20 as an external output device. As the connection method, any technology such as USB, HDMI®, or Bluetooth® can be used.

The functions of the control apparatus 20 are realized by execution of a control program according to the present embodiment by a processor serving as the controller 21. That is, the functions of the control apparatus 20 are realized by software. The control program causes a computer to execute the operations of the control apparatus 20, thereby causing the computer to function as the control apparatus 20. That is, the computer executes the operations of the control apparatus 20 in accordance with the control program to thereby function as the control apparatus 20.

The program can be stored on a non-transitory computer readable medium. The non-transitory computer readable medium is, for example, flash memory, a magnetic recording device, an optical disc, a magneto-optical recording medium, or ROM. The program is distributed, for example, by selling, transferring, or lending a portable medium such as an SD card, a DVD, or a CD-ROM on which the program is stored. The term "SD" is an abbreviation of Secure Digital. The term "DVD" is an abbreviation of digital versatile disc. The term "CD-ROM" is an abbreviation of compact disc read only memory. The program may be distributed by storing the program in a storage of a server and transferring the program from the server to another computer. The program may be provided as a program product.

For example, the computer temporarily stores, in a main memory, a program stored in a portable medium or a program transferred from a server. Then, the computer reads the program stored in the main memory using a processor, and executes processes in accordance with the read program using the processor. The computer may read a program directly from the portable medium, and execute processes in accordance with the program. The computer may, each time a program is transferred from the server to the computer, sequentially execute processes in accordance with the received program. Instead of transferring a program from the server to the computer, processes may be executed by a so-called ASP type service that realizes functions only by execution instructions and result acquisitions. The term "ASP" is an abbreviation of application service provider. Programs encompass information that is to be used for processing by an electronic computer and is thus equivalent to a program. For example, data that is not a direct command to a computer but has a property that regulates processing of the computer is "equivalent to a program" in this context.

Some or all of the functions of the control apparatus 20 may be realized by a programmable circuit or a dedicated circuit serving as the controller 21. That is, some or all of the functions of the control apparatus 20 may be realized by hardware.

Figure 3:
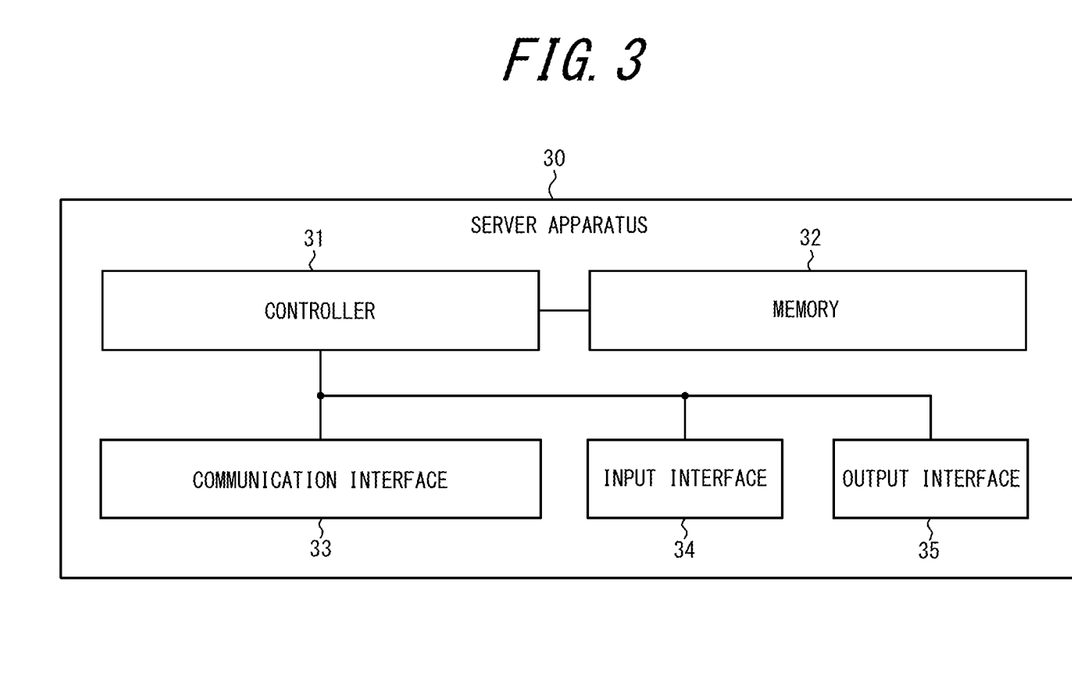
FIG. 3 is a block diagram illustrating a configuration of a server apparatus according to the first embodiment of the present disclosure.

A configuration of the server apparatus 30 according to the present embodiment will be described with reference to FIG. 3.

The server apparatus 30 includes a controller 31, a memory 32, a communication interface 33, an input interface 34, and an output interface 35.

The controller 31 includes at least one processor, at least one programmable circuit, at least one dedicated circuit, or any combination thereof. The processor is a general purpose processor such as a CPU or a GPU, or a dedicated processor that is dedicated to specific processing. The programmable circuit is, for example, an FPGA. The dedicated circuit is, for example, an ASIC. The controller 31 executes processes related to operations of the server apparatus 30 while controlling components of the server apparatus 30.

The memory 32 includes at least one semiconductor memory, at least one magnetic memory, at least one optical memory, or any combination thereof. The semiconductor memory is, for example, RAM or ROM. The RAM is, for example, SRAM or DRAM. The ROM is, for example, EEPROM. The memory 32 functions as, for example, a main memory, an auxiliary memory, or a cache memory. The memory 32 stores data to be used for the operations of the server apparatus 30 and data obtained by the operations of the server apparatus 30.

The communication interface 33 includes at least one interface for communication. The interface for communication is, for example, a LAN interface. The communication interface 33 receives data to be used for the operations of the server apparatus 30, and transmits data obtained by the operations of the server apparatus 30.

The input interface 34 includes at least one interface for input. The interface for input is, for example, a physical key, a capacitive key, a pointing device, a touch screen integrally provided with a display, a camera, or a microphone. The input interface 34 accepts an operation for inputting data to be used for the operations of the server apparatus 30. The input interface 34, instead of being included in the server apparatus 30, may be connected to the server apparatus 30 as an external input device. As the connection method, any technology such as USB, HDMI®, or Bluetooth® can be used.

The output interface 35 includes at least one interface for output. The interface for output is, for example, a display or a speaker. The display is, for example, an LCD or an organic EL display. The output interface 35 outputs data obtained by the operations of the server apparatus 30. The output interface 35, instead of being included in the server apparatus 30, may be connected to the server apparatus 30 as an external output device. As the connection method, any technology such as USB, HDMI®, or Bluetooth® can be used.

The functions of the server apparatus 30 are realized by execution of a server program according to the present embodiment by a processor serving as the controller 31. That is, the functions of the server apparatus 30 are realized by software. The server program causes a computer to execute the operations of the server apparatus 30, thereby causing the computer to function as the server apparatus 30. That is, the computer executes the operations of the server apparatus 30 in accordance with the server program to thereby function as the server apparatus 30.

Some or all of the functions of the server apparatus 30 may be realized by a programmable circuit or a dedicated circuit serving as the controller 31. That is, some or all of the functions of the server apparatus 30 may be realized by hardware.

Figure 4:
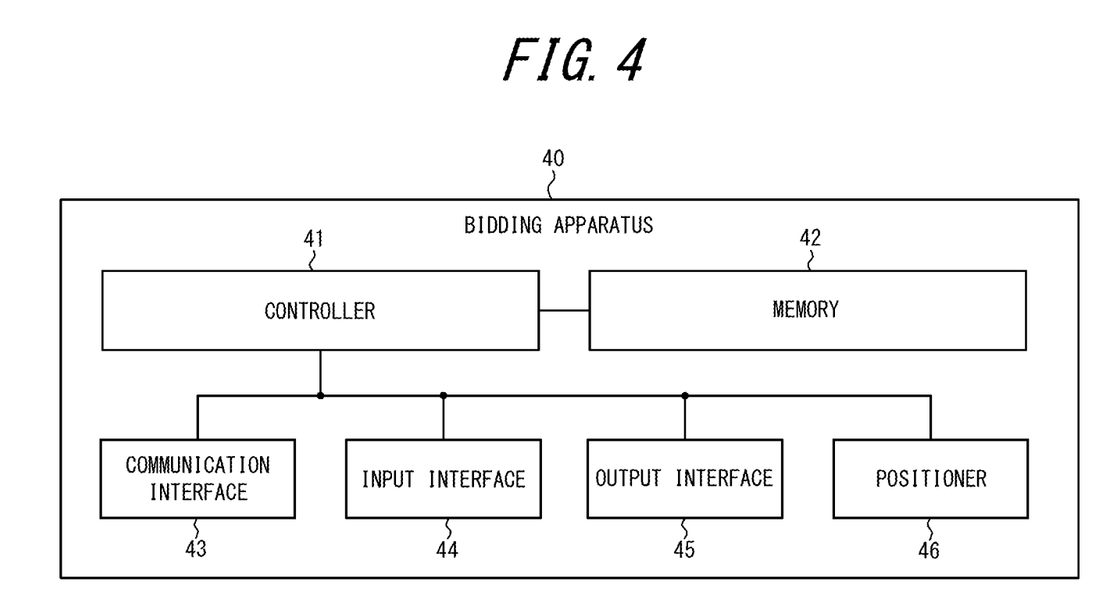
FIG. 4 is a block diagram illustrating a configuration of a bidding apparatus according to the first embodiment of the present disclosure.

A configuration of the bidding apparatus 40 according to the present embodiment will be described with reference to FIG. 4.

The bidding apparatus 40 includes a controller 41, a memory 42, a communication interface 43, an input interface 44, an output interface 45, and a positioner 46.

The controller 41 includes at least one processor, at least one programmable circuit, at least one dedicated circuit, or any combination thereof. The processor is a general purpose processor such as a CPU or a GPU, or a dedicated processor that is dedicated to specific processing. The programmable circuit is, for example, an FPGA. The dedicated circuit is, for example, an ASIC. The controller 41 executes processes related to operations of the bidding apparatus 40 while controlling components of the bidding apparatus 40.

The memory 42 includes at least one semiconductor memory, at least one magnetic memory, at least one optical memory, or any combination thereof. The semiconductor memory is, for example, RAM or ROM. The RAM is, for example, SRAM or DRAM. The ROM is, for example, EEPROM. The memory 42 functions as, for example, a main memory, an auxiliary memory, or a cache memory. The memory 42 stores data to be used for the operations of the bidding apparatus 40 and data obtained by the operations of the bidding apparatus 40.

The communication interface 43 includes at least one interface for communication. The interface for communication is, for example, an interface compliant with a mobile communication standard such as LTE, the 4G standard, or the 5G standard, an interface compliant with a short-range wireless communication standard such as Bluetooth®, or a LAN interface. The term "LTE" is an abbreviation of Long Term Evolution. The term "4G" is an abbreviation of 4th generation. The term "5G" is an abbreviation of 5th generation. The communication interface 43 receives data to be used for the operations of the bidding apparatus 40, and transmits data obtained by the operations of the bidding apparatus 40.

The input interface 44 includes at least one interface for input. The interface for input is, for example, a physical key, a capacitive key, a pointing device, a touch screen integrally provided with a display, a camera, or a microphone. The input interface 44 accepts an operation for inputting data to be used for the operations of the bidding apparatus 40. The input interface 44, instead of being included in the bidding apparatus 40, may be connected to the bidding apparatus 40 as an external input device. As the connection method, any technology such as USB, HDMI®, or Bluetooth® can be used.

The output interface 45 includes at least one interface for output. The interface for output is, for example, a display or a speaker. The display is, for example, an LCD or an organic EL display. The output interface 45 outputs data obtained by the operations of the bidding apparatus 40. The output interface 45, instead of being included in the bidding apparatus 40, may be connected to the bidding apparatus 40 as an external output device. As the connection method, any technology such as USB, HDMI®, or Bluetooth® can be used.

The positioner 46 includes at least one GNSS receiver. The term "GNSS" is an abbreviation of global navigation satellite system. GNSS is, for example, GPS, QZSS, GLONASS, or Galileo. The term "GPS" is an abbreviation of Global Positioning System. The term "QZSS" is an abbreviation of Quasi-Zenith Satellite System. QZSS satellites are called quasi-zenith satellites. The term "GLONASS" is an abbreviation of Global Navigation Satellite System. The positioner 46 measures the position of the bidding apparatus 40.

The functions of the bidding apparatus 40 are realized by execution of a bidding program according to the present embodiment by a processor serving as the controller 41. That is, the functions of the bidding apparatus 40 are realized by software. The bidding program causes a computer to execute the operations of the bidding apparatus 40, thereby causing the computer to function as the bidding apparatus 40. That is, the computer executes the operations of the bidding apparatus 40 in accordance with the bidding program to thereby function as the bidding apparatus 40.

Some or all of the functions of the bidding apparatus 40 may be realized by a programmable circuit or a dedicated circuit serving as the controller 41. That is, some or all of the functions of the bidding apparatus 40 may be realized by hardware.

Figure 5:
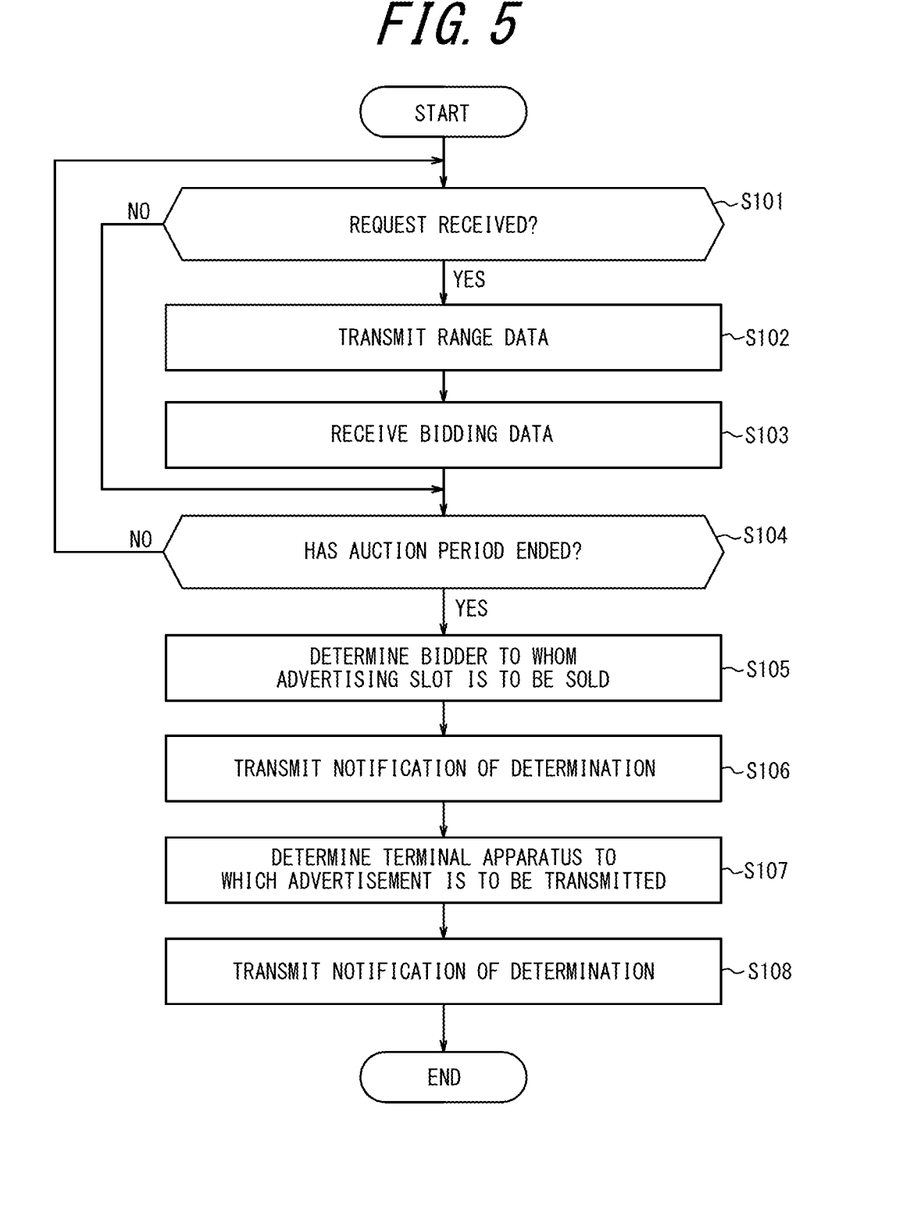
FIG. 5 is a flowchart illustrating operations of the control apparatus according to the first embodiment of the present disclosure.
Figure 6:
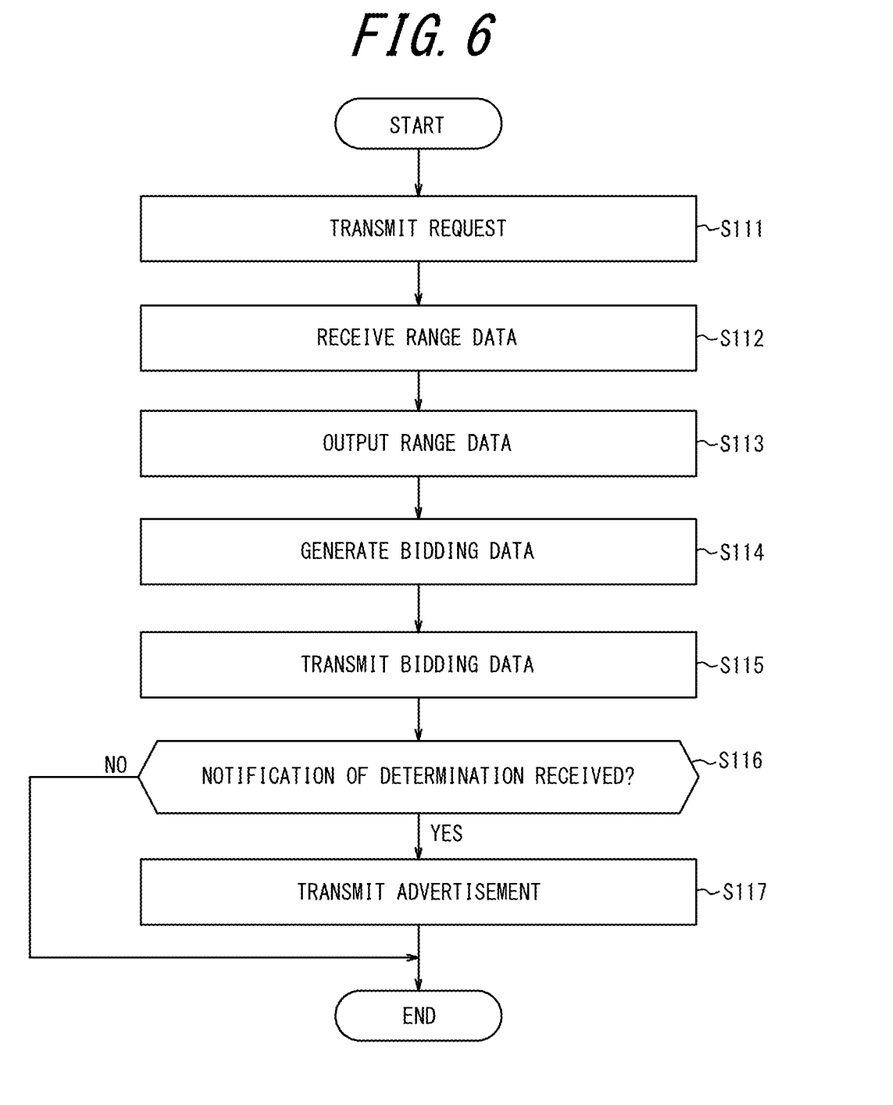
FIG. 6 is a flowchart illustrating operations of the bidding apparatus according to the first embodiment of the present disclosure.
Figure 7:
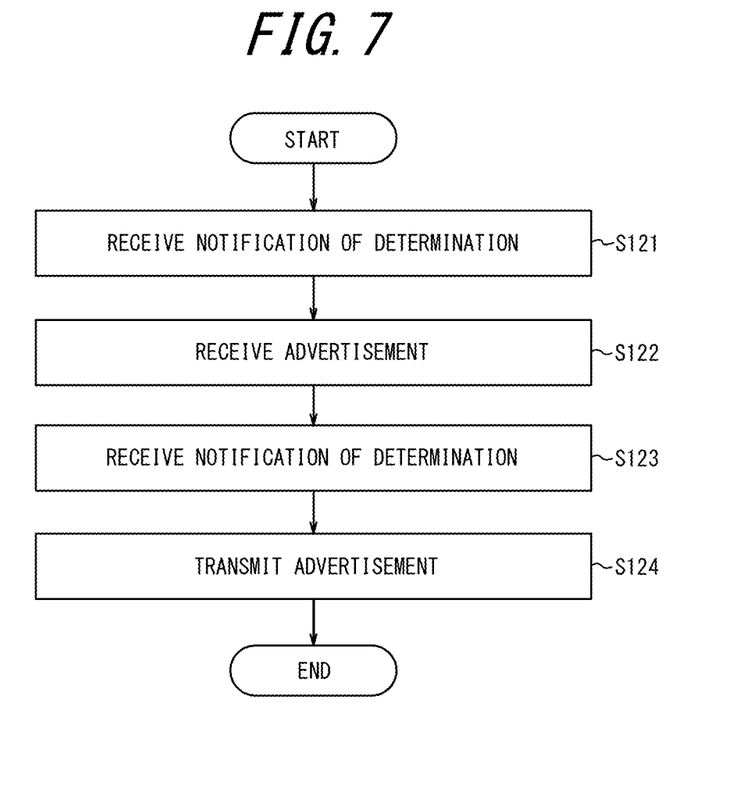
FIG. 7 is a flowchart illustrating operations of the server apparatus according to the first embodiment of the present disclosure.

Operations of the communication system 10 according to the present embodiment will be described with reference to FIGS. 5 to 7. These operations correspond to an advertisement sales method according to the present embodiment. FIG. 5 illustrates operations of the control apparatus 20. FIG. 6 illustrates operations of the bidding apparatus 40. FIG. 7 illustrates operations of the server apparatus 30.

In step S111 of FIG. 6, the controller 41 of the bidding apparatus 40 accepts, with the input interface 44 such as a touch screen, an operation by the user 16, such as inputting a URL of an auction site or selecting a link to an auction site. The term "URL" is an abbreviation of uniform resource locator. The controller 41 controls the communication interface 43 to transmit a request R1 in response to the accepted operation. The communication interface 43 transmits the request R1 to the control apparatus 20.

In step S101 of FIG. 5, when the communication interface 23 of the control apparatus 20 receives, from the bidding apparatus 40, the request R1 transmitted in step S111 of FIG. 6, the process in step S102 is performed. In a case in which the request R1 is not received, the process in step S104 is performed.

In step S102 of FIG. 5, the controller 21 of the control apparatus 20 controls the communication interface 23 to transmit range data D1 in response to the request R1 received in step S101. The range data D1 is data indicating a geographical range through which at least one vehicle 11 travels. This geographical range may be set in advance, or may be set according to a demand from the user 16. In the present embodiment, the range data D1 includes data indicating a section 13 of the road 12 as the geographical range. Specifically, the range data D1 includes data indicating the position of the beginning of the section 13, and the length or the position of the end of the section 13. In the present embodiment, the range data D1 is data further indicating a time range during which the at least one vehicle 11 travels through the section 13. This time range, like the geographical range, may be set in advance, or may be set according to a demand from the user 16. In the present embodiment, the range data D1 includes data indicating a date and a time of day as the time range. Specifically, the range data D1 includes data indicating a start date and time, and the length of a time period or an end date and time. The communication interface 23 transmits the range data D1 to the bidding apparatus 40.

In step S112 of FIG. 6, the communication interface 43 of the bidding apparatus 40 receives, from the control apparatus 20, the range data D1 transmitted in step S102 of FIG. 5.

In step S113 of FIG. 6, the controller 41 of the bidding apparatus 40 acquires the range data D1 received in step S112. The controller 41 performs control to output the acquired range data D1.

The range data D1 may be output using any method. For example, the section 13 of the road 12 and the date and the time of day that are indicated by the range data D1 are displayed on a screen of a display serving as the output interface 45 of the bidding apparatus 40. Alternatively, the section 13 of the road 12 and the date and the time of day that are indicated by the range data D1 are output as audio from a speaker serving as the output interface 45.

In step S114 of FIG. 6, the controller 41 of the bidding apparatus 40 accepts, with the input interface 44 such as a touch screen, an operation by the user 16 to input information regarding bidding. The information regarding bidding includes a user identifier such as an email address of the user 16, and a bidding price. The controller 41 generates bidding data D2 in response to the accepted operation. The bidding data D2 is data for bidding on an advertising slot associated with the geographical range indicated by the range data D1. In the present embodiment, the bidding data D2 is data for bidding on, as the advertising slot, a slot associated with the combination of the geographical range and the time range that are indicated by the range data D1. Specifically, the bidding data D2 includes data indicating the user identifier and the bidding price that are input by the user 16.

In step S115 of FIG. 6, the controller 41 of the bidding apparatus 40 controls the communication interface 43 to transmit the bidding data. D2 generated in step S114. The communication interface 43 transmits the bidding data D2 to the control apparatus 20.

In step S103 of FIG. 5, the communication interface 23 of the control apparatus 20 receives, from the bidding apparatus 40, the bidding data D2 transmitted in step S115 of FIG. 6. The controller 21 of the control apparatus 20 acquires the bidding data D2 received by the communication interface 23. The controller 21 stores the acquired bidding data D2 in the memory 22.

In step S104 of FIG. 5, the controller 21 of the control apparatus 20 determines whether the auction period has ended. The auction period may be set in advance, or may be set according to a demand from the user 16. In a case in which the auction period has ended, the process in step S105 is performed. In a case in which the auction period has not ended, the process in step S101 is performed again. During the auction period, the processes in step S101 to step S103 are performed for each bid, and corresponding bidding data D2 is stored in the memory 22.

In step S105 of FIG. 5, the controller 21 of the control apparatus 20 determines a bidder to whom the advertising slot is to be sold based on the bidding data D2 stored in the memory 22. Specifically, the controller 21 determines the bidder to whom the advertising slot is to be sold according to the bidding price indicated by the bidding data D2. For example, in a case in which only one person bids on the advertising slot within the auction period, the controller 21 determines the one person to be the bidder to whom the advertising slot is to be sold. On the other hand, in a case in which two or more persons bid on the advertising slot within the auction period, the controller 21 determines the person for whom the bidding price indicated by the bidding data D2 is the highest to be the bidder to whom the advertising slot is to be sold.

In step S106 of FIG. 5, the controller 21 of the control apparatus 20 controls the communication interface 23 to transmit notification N1 of the determination in step S105. The controller 21 includes, in the notification N1, data indicating the user identifier of the bidder to whom the advertising slot is to be sold, with reference to the bidding data D2 stored in the memory 22. The communication interface 23 transmits the notification N1 to the server apparatus 30 and to a bidding apparatus 40 of the bidder determined in step S105.

In the present embodiment, the controller 21 of the control apparatus 20 sells the advertising slot to the bidder determined in step S105 by executing payment processing of the bidding price. As the payment processing method, any method can be used. For example, a method can be used in which the bidding price is charged to a credit card or a bank account registered in advance in association with the bidder.

In step S116 of FIG. 6, when the communication interface 43 of the bidding apparatus 40 receives, from the control apparatus 20, the notification N1 transmitted in step S106 of FIG. 5, the process in step S117 is performed. In a case in which the notification N1 is not received, it means that the user 16 has failed to purchase the advertising slot, and the flow of FIG. 6 ends.

In step S117 of FIG. 6, the controller 41 of the bidding apparatus 40 controls the communication interface 43 to transmit an advertisement 14 to be presented in the purchased advertising slot. The advertisement 14 may be stored in advance in the memory 42, or may be acquired from an external system. The communication interface 43 transmits the advertisement 14 to the server apparatus 30.

In step S121 of FIG. 7, the communication interface 33 of the server apparatus 30 receives, from the control apparatus 20, the notification N1 transmitted in step S106 of FIG. 5.

In step S122 of FIG. 7, the communication interface 33 of the server apparatus 30 receives, from the bidding apparatus 40, the advertisement 14 transmitted in step S117 of FIG. 6. The controller 31 of the server apparatus 30 acquires the advertisement 14 received by the communication interface 33. The controller 31 stores the acquired advertisement 14 in the memory 32 in association with the user identifier that is indicated by the notification N1 received in step S121.

In step S107 of FIG. 5, the controller 21 of the control apparatus 20 determines at least one terminal apparatus mounted or installed in a vehicle 11 traveling through the section 13 of the road 12 to be a terminal apparatus to which the advertisement 14 is to be transmitted from the server apparatus 30.

The terminal apparatus to which the advertisement 14 is to be transmitted may be determined in any procedure, but in the present embodiment, is determined in the following procedure.

The communication interface 23 of the control apparatus 20 receives positional data D3 from terminal apparatuses such as the first terminal apparatus 50 and the second terminal apparatus 60 on the date and the time of day that are indicated by the range data D1. The positional data D3 is data indicating the positions of vehicles 11. Specifically, the positional data D3 is data indicating a position measured by a corresponding GNSS receiver embedded in or connected to each terminal apparatus. The controller 21 of the control apparatus 20 acquires the positional data D3 received by the communication interface 23. The controller 21 determines whether the positions indicated by the acquired positional data D3 are within the section 13 of the road 12. In a case in which the position of a vehicle 11 is within the section 13, the controller 21 determines a terminal apparatus mounted or installed in the vehicle 11 to be the terminal apparatus to which the advertisement 14 is to be transmitted.

Instead of directly determining that the position of the vehicle 11 is within the section 13, it may be indirectly determined that the position of the vehicle 11 is within the section 13 by acquiring data transmitted when the position of the vehicle 11 is within the section 13. In such a variation, an antenna compliant with any wireless communication method, such as DSRC, is installed on or near the road 12. The term "DSRC" is an abbreviation of dedicated short-range communications. The coverage area of the antenna is adjusted so as to correspond with the section 13. When the vehicle 11 travels through the coverage area, data is transmitted to the antenna from a wireless communication device embedded in or connected to the corresponding terminal apparatus. The communication interface 23 of the control apparatus 20 receives the data from the antenna. The controller 21 of the control apparatus 20 determines that the position of the vehicle 11 is within the section 13 by acquiring the data received by the communication interface 23.

Instead of directly determining that the position of the vehicle 11 is within the section 13, it may be indirectly determined that the position of the vehicle 11 is within the section 13 by analyzing an image captured when the position of the vehicle 11 is within the section 13. In such a variation, a camera with a resolution high enough to recognize vehicle registration numbers printed on license plates is installed on or near the road 12. The coverage area of the camera is adjusted so as to correspond with the section 13. When the vehicle 11 travels through the coverage area, an image of the vehicle 11 is captured by the camera. The communication interface 23 of the control apparatus 20 receives the image from the camera. The controller 21 of the control apparatus 20 determines that the position of the vehicle 11 is within the section 13 by analyzing the image received by the communication interface 23.

In step S108 of FIG. 5, the controller 21 of the control apparatus 20 controls the communication interface 23 to transmit notification N2 of the determination in step S107. The controller 21 includes, in the notification N2, data indicating the user identifier of the bidder by whom the advertising slot has been purchased, with reference to the bidding data D2 stored in the memory 22. The controller 21 also includes, in the notification N2, data indicating a terminal identifier such as an IP address of the terminal apparatus to which the advertisement 14 is to be transmitted. The term "IP" is an abbreviation of Internet Protocol. The communication interface 23 transmits the notification N2 to the server apparatus 30.

In step S123 of FIG. 7, the communication interface 33 of the server apparatus 30 receives, from the control apparatus 20, the notification N2 transmitted in step S108 of FIG. 5.

In step S124 of FIG. 7, the controller 31 of the server apparatus 30 acquires the advertisement 14 stored in the memory 32 in association with the same user identifier as the user identifier that is indicated by the notification N2 received in step S123. The controller 31 controls the communication interface 33 to transmit the acquired advertisement 14. The communication interface 33 transmits the advertisement 14 to the terminal apparatus associated with the terminal identifier indicated by the notification N2.

For example, assuming that a car navigation device serving as the first terminal apparatus 50 receives the advertisement 14 transmitted in step S124, the advertisement 14 is displayed on a display of the car navigation device, thereby presenting, by the first terminal apparatus 50, the advertisement 14 to a person 15 on board a vehicle 11 in which the first terminal apparatus 50 is mounted. Alternatively, assuming that a smartphone serving as the first terminal apparatus 50 receives the advertisement 14 transmitted in step S124, the advertisement 14 is displayed on a display audio connected to the smartphone, thereby presenting, by the first terminal apparatus 50, the advertisement 14 to a person 15 on board a vehicle 11 in which the first terminal apparatus 50 is installed. Alternatively, assuming that the second terminal apparatus 60 receives the advertisement 14 transmitted in step S124, the advertisement 14 is displayed on the display 61 connected to the second terminal apparatus 60, thereby presenting, by the second terminal apparatus 60, the advertisement 14 to the outside of a corresponding vehicle 11.

In the present embodiment, the communication interface 33 of the server apparatus 30 also transmits the advertisement 14 to the advertising sign 70, which is installed at an outdoor location visible from the section 13 of the road 12. For example, when digital signage serving as the advertising sign 70 receives the advertisement 14, the advertisement 14 is displayed on the digital signage, thereby presenting the advertisement 14 by the advertising sign 70.

As described above, in the present embodiment, the communication interface 23 of the control apparatus 20 transmits, to at least one bidding apparatus 40, range data D1 indicating a geographical range through which at least one vehicle 11 travels. The communication interface 43 of the at least one bidding apparatus 40 receives the range data D1 from the control apparatus 20. The controller 41 of the at least one bidding apparatus 40 performs control to output the range data D1 received by the communication interface 43. The controller 41 generates, in response to an operation by a user 16, bidding data D2 for bidding on an advertising slot associated with the geographical range indicated by the range data D1. The communication interface 43 transmits the bidding data D2 generated by the controller 41 to the control apparatus 20. The communication interface 23 of the control apparatus 20 receives the bidding data D2 from the at least one bidding apparatus 40. The controller 21 of the control apparatus 20 determines a bidder to whom the advertising slot is to be sold based on the bidding data D2 received by the communication interface 23.

According to the present embodiment, advertising slots can be sold in association with a specific geographical range. Bidders can present, in purchased advertising slots, advertisements 14 related to the associated geographical range. As a result, it is expected that the effectiveness in promotion may be improved. It is also expected that costs for promotion may be reduced.

According to the present embodiment, it is possible to auction advertising slots for the inside of vehicles 11, the outside of vehicles 11, or the advertising sign 70, which is installed at a location by which vehicles 11 pass. The auction may be conducted in an open format where bidding prices are disclosed, or may be conducted in a closed format where bidding prices are not disclosed. As the type of advertising slot, either the inside of vehicles 11, the outside of vehicles 11, or the advertising sign 70 may be selected. The length of a time period during which an advertisement 14 is to be presented may be selected. The size of a space in which an advertisement 14 is to be presented may be selected.

A second embodiment, a variation of the first embodiment, will be described.

Figure 8:
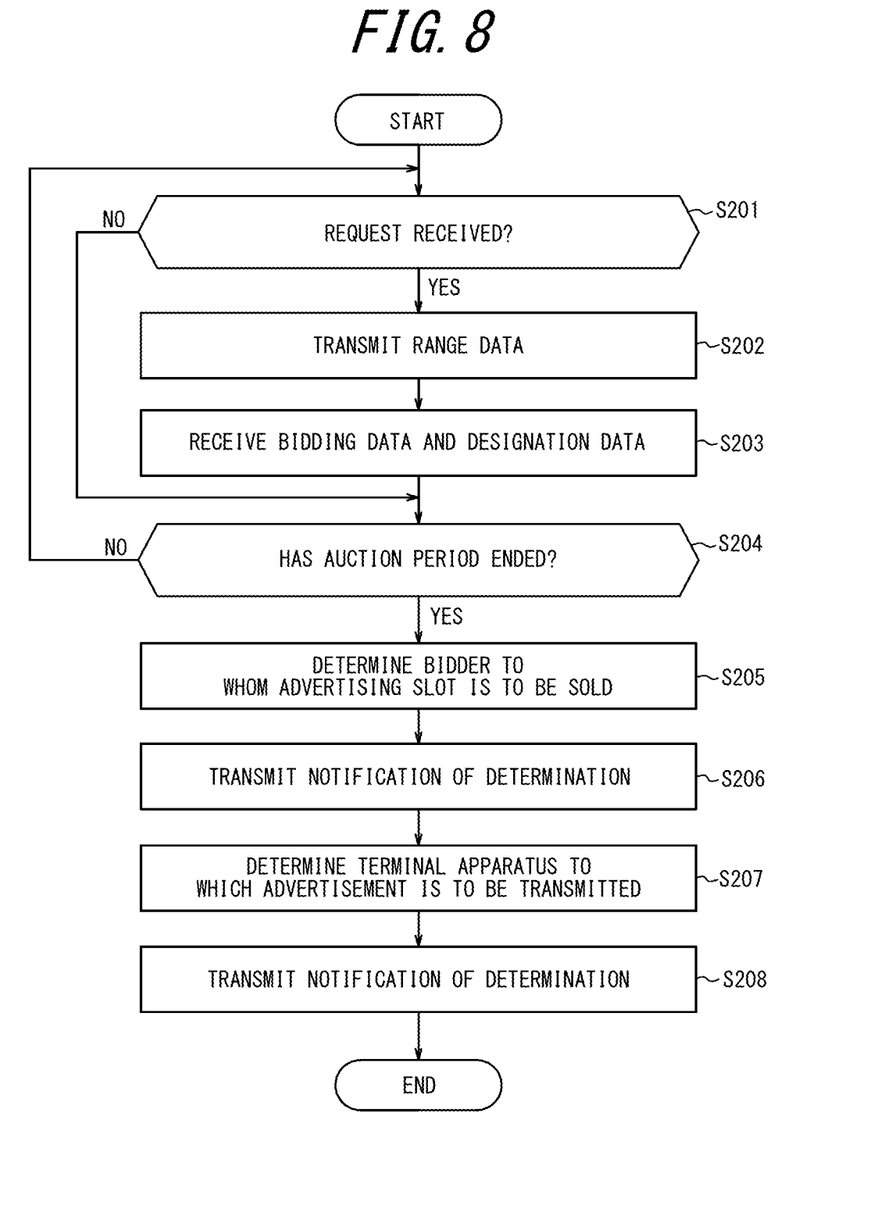
FIG. 8 is a flowchart illustrating operations of the control apparatus according to a second embodiment of the present disclosure.
Figure 9:
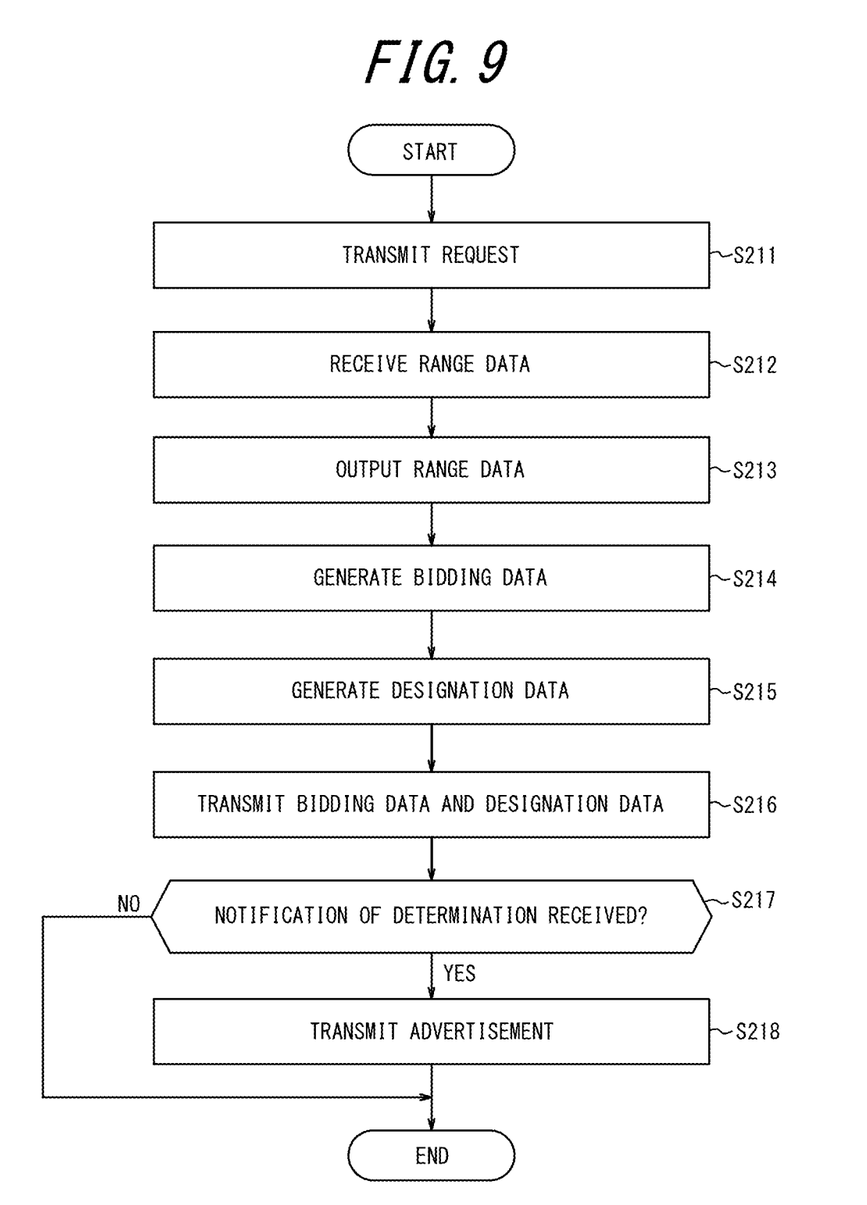
FIG. 9 is a flowchart illustrating operations of the bidding apparatus according to the second embodiment of the present disclosure.

Operations of the communication system 10 according to the present embodiment will be described with reference to FIGS. 8 and 9. These operations correspond to an advertisement sales method according to the present embodiment. FIG. 8 illustrates operations of the control apparatus 20. FIG. 9 illustrates operations of the bidding apparatus 40.

The processes in step S211 of FIG. 9, step S201 and step S202 of FIG. 8, and step S212 to step S214 of FIG. 9 are the same as the processes in step S111 of FIG. 6, step S101 and step S102 of FIG. 5, and step S112 to step S114 of FIG. 6, respectively, and thus descriptions thereof are omitted.

In step S215 of FIG. 9, the controller 41 of the bidding apparatus 40 accepts, with the input interface 44 such as a touch screen, an operation by the user 16 to input a condition for a vehicle 11 in which a terminal apparatus to which an advertisement 14 is to be transmitted is mounted or installed. The condition includes a departure point, a destination, a travel route, or any combination thereof. The controller 41 generates designation data D4 in response to the accepted operation. The designation data D4 is data for designating a condition for a vehicle 11 in which a terminal apparatus to which the advertisement 14 is to be transmitted is mounted or installed. In the present embodiment, the designation data D4 includes data indicating the departure point, the destination, the travel route, or any combination thereof input by the user 16.

In step S216 of FIG. 9, the controller 41 of the bidding apparatus 40 controls the communication interface 43 to transmit the bidding data D2 generated in step S214 and the designation data D4 generated in step S215. The communication interface 43 transmits the bidding data D2 and the designation data D4 to the control apparatus 20.

In step S203 of FIG. 8, the communication interface 23 of the control apparatus 20 receives, from the bidding apparatus 40, the bidding data D2 and the designation data D4 that are transmitted in step S216 of FIG. 9. The controller 21 of the control apparatus 20 acquires the bidding data D2 and the designation data D4 that are received by the communication interface 23. The controller 21 stores the bidding data D2 and the designation data D4 that are acquired in the memory 22.

The processes in step S204 to step S206 of FIG. 8, and step S217 and step S218 of FIG. 9 are the same as the processes in step S104 to step S106 of FIG. 5, and step S116 and step S117 of FIG. 6, respectively, and thus descriptions thereof are omitted.

In step S207 of FIG. 8, the controller 21 of the control apparatus 20 determines at least one terminal apparatus mounted or installed in a vehicle 11 traveling through the section 13 of the road 12 to be a terminal apparatus to which the advertisement 14 is to be transmitted from the server apparatus 30 based on the designation data D4 stored in the memory 22.

The terminal apparatus to which the advertisement 14 is to be transmitted may be determined in any procedure, but in the present embodiment, is determined in the following procedure.

The communication interface 23 of the control apparatus 20 receives departure point data D5, destination data D6, and route data D7 together with positional data D3 from terminal apparatuses such as the first terminal apparatus 50 and the second terminal apparatus 60 on the date and the time of day that are indicated by the range data D1. The departure point data D5 is data indicating departure points of vehicles 11. The destination data D6 is data indicating destinations of vehicles 11. The route data D7 is data indicating travel routes of vehicles 11. For example, the departure point data D5, the destination data D6, and the route data D7 are data indicating a departure point, a destination, and a travel route recorded or set in a car navigation device serving as the first terminal apparatus 50, respectively. Alternatively, the departure point data D5, the destination data D6, and the route data D7 are data indicating a departure point, a destination, and a travel route recorded or set in a map application running on a smartphone serving as the first terminal apparatus 50, respectively. Alternatively, the departure point data D5, the destination data D6, and the route data D7 are data indicating a departure point, a destination, and a travel route recorded or set in the second terminal apparatus 60, respectively. The controller 21 of the control apparatus 20 acquires the positional data. D3, the departure point data D5, the destination data D6, and the route data D7 that are received by the communication interface 23. The controller 21 determines whether the positions indicated by the acquired positional data D3 are within the section 13 of the road 12. The controller 21 determines whether the departure points indicated by the acquired departure point data D5 match the departure point that is indicated by the designation data D4 received from the bidding apparatus 40 of the bidder determined in step S205. The controller 21 determines whether the destinations indicated by the acquired destination data D6 match the destination that is indicated by the designation data D4 received from the bidding apparatus 40 of the bidder determined in step S205. The controller 21 determines whether the travel routes indicated by the acquired route data D7 match the travel route that is indicated by the designation data D4 received from the bidding apparatus 40 of the bidder determined in step S205. In a case in which the position of a vehicle 11 is within the section 13, and the departure point, the destination, the travel route, or a specific combination thereof of the vehicle 11 matches the designated one, the controller 21 determines a terminal apparatus mounted or installed in the vehicle 11 to be the terminal apparatus to which the advertisement 14 is to be transmitted.

The process in step S208 of FIG. 8 is the same as the process in step S108 of FIG. 5, and thus a description thereof is omitted.

As described above, in the present embodiment, the communication interface 23 of the control apparatus 20 receives, from a bidding apparatus 40 of a bidder determined by the controller 21, designation data D4 for designating a condition for a vehicle 11 in which a terminal apparatus to which an advertisement 14 is to be transmitted from the server apparatus 30 is mounted or installed. The controller 21 of the control apparatus 20 determines the terminal apparatus to which the advertisement 14 is to be transmitted based on the designation data D4 received by the communication interface 23.

According to the present embodiment, bidders can present, in purchased advertising slots, advertisements 14 suitable for a condition such as a departure point, a destination, or a travel route that is designated. For example, it is possible to present, to persons 15 who are on board vehicles 11, advertisements inside the vehicles 11 regarding a POI that is not in the vicinity of the departure point or that is in the vicinity of the destination. As a result, it is expected that the effectiveness in promotion may be further improved.

The present disclosure is not limited to the embodiments described above. For example, a plurality of blocks described in the block diagrams may be integrated, or a block may be divided. Instead of executing a plurality of steps described in the flowcharts in chronological order in accordance with the description, the plurality of steps may be executed in parallel or in a different order according to the processing capability of the apparatus that executes each step, or as required. Other modifications can be made without departing from the spirit of the present disclosure.

For example, at least some of the operations of the server apparatus 30 may be performed by the control apparatus 20. The server apparatus 30 may be integrated with the control apparatus 20.

The invention claimed is:

1. A communication system comprising:
   a server apparatus;
   at least one bidding apparatus;
   at least one terminal apparatus; and
   a control apparatus that includes a communication interface and a controller, the communication interface is configured to transmit, to the at least one bidding apparatus, range data indicating a geographical range through which at least one vehicle travels, and receive, from the at least one bidding apparatus, bidding data for bidding on an advertising slot associated with the geographical range indicated by the range data, the controller is configured to determine a bidder to whom the advertising slot is to be sold based on the bidding data received by the communication interface,
   wherein the server apparatus is configured to transmit an advertisement to the at least one terminal apparatus that is mounted or installed in a vehicle traveling through the geographical range and that is configured to present the advertisement to outside of the vehicle in order to present the advertisement to occupants on board other vehicles traveling through the geographical range,
   the vehicle including a display attached externally to the vehicle and a global navigation satellite system receiver configured to measure a current position of the vehicle in real time, and
   wherein the control apparatus is configured to receive an image of the vehicle from a camera whose coverage area is adjusted to correspond with the geographical range, analyze the received image to identify a registration number on a license plate of the vehicle, determine whether the vehicle is traveling in the geographical range upon identification of the registration number, and cause the at least one terminal apparatus to display the advertisement on the display attached externally to the vehicle while the vehicle is traveling in the geographical range.

2. The communication system according to claim 1, wherein
   the range data is data further indicating a time range during which the at least one vehicle travels through the geographical range, and
   the bidding data is data for bidding on, as the advertising slot, a slot associated with a combination of the geographical range and the time range that are indicated by the range data.

3. The communication system according to claim 1, wherein the range data includes data indicating a section of a road as the geographical range.

4. The communication system according to claim 1, wherein
   the bidding data includes data indicating a bidding price, and
   the controller is configured to determine the bidder to whom the advertising slot is to be sold according to the bidding price indicated by the bidding data.

5. The communication system according to claim 1, wherein
   the communication interface is configured to receive, from a bidding apparatus of the bidder determined by the controller, designation data for designating a condition for a vehicle in which a terminal apparatus to which the advertisement is to be transmitted from the server apparatus is mounted or installed, and
   the controller is configured to determine the terminal apparatus to which the advertisement is to be transmitted based on the designation data received by the communication interface.

6. The communication system according to claim 5, wherein
   the designation data includes data indicating a departure point, and
   the controller is configured to determine the terminal apparatus to which the advertisement is to be transmitted according to whether a departure point of the vehicle traveling through the geographical range matches the departure point indicated by the designation data.

7. The communication system according to claim 5, wherein
   the designation data includes data indicating a destination, and
   the controller is configured to determine the terminal apparatus to which the advertisement is to be transmitted according to whether a destination of the vehicle traveling through the geographical range matches the destination indicated by the designation data.

8. The communication system according to claim 5, wherein
   the designation data includes data indicating a travel route, and
   the controller is configured to determine the terminal apparatus to which the advertisement is to be transmitted according to whether a travel route of the vehicle traveling through the geographical range matches the travel route indicated by the designation data.

9. The communication system according to claim 1, wherein the server apparatus is configured to transmit the advertisement to a terminal apparatus configured to present the advertisement to a person who is on board the vehicle traveling through the geographical range.

10. The communication system according to claim 1, wherein the server apparatus is configured to transmit the advertisement to be presented in the advertising slot to an advertising sign installed at an outdoor location visible from the geographical range.

11. An advertisement sales method comprising:
transmitting, by a control apparatus to at least one bidding apparatus, range data indicating a geographical range through which at least one vehicle travels;
receiving, by the control apparatus from the at least one bidding apparatus, bidding data for bidding on an advertising slot associated with the geographical range indicated by the range data;
determining, by the control apparatus, a bidder to whom the advertising slot is to be sold based on the bidding data;
transmitting, by a server, an advertisement to at least one terminal apparatus that is mounted or installed in a vehicle traveling through the geographical range and that is configured to present the advertisement to outside of the vehicle in order to present the advertisement to occupants on board other vehicles traveling through the geographical range, the vehicle including a display attached externally to the vehicle and a global navigation satellite system receiver configured to measure a current position of the vehicle in real time; and
receiving an image of the vehicle from a camera whose coverage area is adjusted to correspond with the geographical range, analyzing the received image to identify a registration number on a license plate of the vehicle, determining whether the vehicle is traveling in the geographical range upon identification of the registration number, and causing the at least one terminal apparatus to display the advertisement on the display attached externally to the vehicle while the vehicle is traveling in the geographical range.

12. The advertisement sales method according to claim 11, wherein
the range data is data further indicating a time range during which the at least one vehicle travels through the geographical range, and
the bidding data is data for bidding on, as the advertising slot, a slot associated with a combination of the geographical range and the time range that are indicated by the range data.

* * * * *